US009563867B2

(12) United States Patent
Talmaki et al.

(10) Patent No.: US 9,563,867 B2
(45) Date of Patent: Feb. 7, 2017

(54) SYSTEM FOR ALLOCATING AND MONITORING MACHINES (71) Applicant: Caterpillar Inc., Peoria, IL (US)

(72) Inventors: Sanat A. Talmaki, Peoria, IL (US); Jason Smallenberger, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/685,332

(22) Filed: Apr. 13, 2015

(65) Prior Publication Data
US 2016/0300175 A1 Oct. 13, 2016

(51) Int. Cl.
G06Q 10/06 (2012.01)
(52) U.S. Cl.
CPC .............................. G06Q 10/06315 (2013.01)
(58) Field of Classification Search
USPC .......................................................... 701/117
See application file for complete search history.

(56) References Cited

U.S. PATENT DOCUMENTS

| 7,333,922 | B2* | 2/2008 | Cannon | G07C 5/008 |
| | | | | 700/108 |
| 7,415,333 | B2 | 8/2008 | Anderson | |
| 8,655,505 | B2* | 2/2014 | Sprock | E02F 9/205 |
| | | | | 701/2 |
| 2006/0229851 | A1* | 10/2006 | Cannon | G07C 5/008 |
| | | | | 702/193 |
| 2008/0208671 | A1 | 8/2008 | Ehrlich et al. | |
| 2008/0244605 | A1 | 10/2008 | Bennington et al. | |
| 2009/0327011 | A1* | 12/2009 | Petroff | G06Q 10/02 |
| | | | | 705/5 |
| 2010/0174577 | A1 | 7/2010 | Duffy et al. | |
| 2012/0046983 | A1 | 2/2012 | Nettleton et al. | |
| 2012/0215378 | A1* | 8/2012 | Sprock | E02F 9/205 |
| | | | | 701/2 |
| 2012/0281089 | A1 | 11/2012 | Schweikart | |
| 2014/0277905 | A1 | 9/2014 | Anderson | |
| 2014/0330605 | A1 | 11/2014 | Connolly et al. | |
| 2014/0350984 | A1 | 11/2014 | Mitti et al. | |

* cited by examiner

Primary Examiner — Anne M Antonucci
(74) Attorney, Agent, or Firm — Leydig, Voit & Mayer, Ltd.

(57) ABSTRACT

A system for allocating resources includes a plurality of first machines at a work area and a plurality of second machines at a remote location. A controller stores a material movement goal for a production time period, and determine a total capacity at the work area based upon a capacity of the first machines and the production time period. The total capacity at the work area is compared to the desired material movement goal and upon the total capacity at the work area exceeding the desired material movement goal, operational instructions are generated for and communicated to selected ones of the first machines. Upon the total capacity at the work area being less than the desired material movement goal an alert command is generated and some of the second machines may be moved to the work area.

19 Claims, 7 Drawing Sheets

SYSTEM FOR ALLOCATING AND MONITORING MACHINES

TECHNICAL FIELD

This disclosure relates generally to allocating machines at a work site and, more particularly, to a system and method for allocating machines and monitoring their operation and re-allocating machines as necessary to achieve desired results.

BACKGROUND

Movable machines such as haul trucks, dozers, motor graders, excavators, wheel loaders, and other types of equipment are used to perform a variety of tasks. For example, these machines may be used to move material and/or alter work surfaces at a work site. The machines may perform operations such as digging, loosening, carrying, etc., different materials at the work site.

Machines that are not being used as part of a material moving operation are not generating revenue. As a result, it is typically desirable to maximize the use of machines at a work site by minimizing the number of machines that may be sitting idle at a work site. Attempts to minimize the number of idle machines at a work site may sometimes result in too few machines being available when needed which may create challenges in meeting desired production goals. For example, the number of machines located at a work site may be insufficient to meet the production goals, particularly in view of changing working condition at the work site.

Scheduling or allocating machines at a work site may be particularly challenging. U.S. Patent Publication No. 2014/0277905 discloses a method for determining a performance metric corresponding to specific machine configurations and assigning a machine configuration based upon the performance metrics.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for allocating resources includes a plurality of first machines at a work area and a plurality of second machines at a remote location remote from the work area. A controller is configured to store a desired material movement goal for a production time period, store a capacity for each of the plurality of first machines, store a capacity for each of the plurality of second machines, and determine a total capacity at the work area based upon the capacity of each of the plurality of first machines and the production time period. The controller is further configured to compare the total capacity at the work area to the desired material movement goal and upon the total capacity at the work area exceeding the desired material movement goal, generate operational instructions for selected ones of the plurality of first machines and communicate the operational instructions to each of the selected ones of the plurality of first machines, and upon the total capacity at the work area being less than the desired material movement goal, generate an alert command.

In another aspect, a controller implemented method of allocating resources includes storing a desired material movement goal for a production time period, storing a capacity for each of a plurality of first machines at a work area, storing a capacity for each of a plurality of second machines at a remote location from the work area, and determining a total capacity at the work area based upon the capacity of each of the plurality of first machines and the production time period. The method further includes comparing the total capacity at the work area to the desired material movement goal, and upon the total capacity at the work area exceeding the desired material movement goal, generating operational instructions for selected ones of the plurality of first machines and communicating the operational instructions to each of the selected ones of the plurality of first machines, and upon the total capacity at the work area being less than the desired material movement goal, generating an alert command.

In still another aspect, a system for allocating resources includes a plurality of first machines at a work area, a plurality of second machines at a remote location remote from the work area, and at least one sensor for monitoring material movement at the work site. A controller is configured to store a desired material movement goal for a production time period, store a capacity for each of the plurality of first machines, store a capacity for each of the plurality of second machines, determine a total capacity at the work area based upon the capacity of each of the plurality of first machines and the production time period, and compare the total capacity at the work area to the desired material movement production goal. Upon the total capacity at the work area exceeding the desired material movement goal, the controller is configured to generate operational instructions for selected ones of the plurality of first machines and communicate the operational instructions to each of the selected ones of the plurality of first machines. Upon the total capacity at the work area being less than the desired material movement goal, the controller is configured to generate an alert command. The controller is further configured to determine operational performance at the work area based upon the material movement at the work site, and upon the operational performance being less than a threshold for a specified time period, generate an alert command.

DETAILED DESCRIPTION

Figure 1:
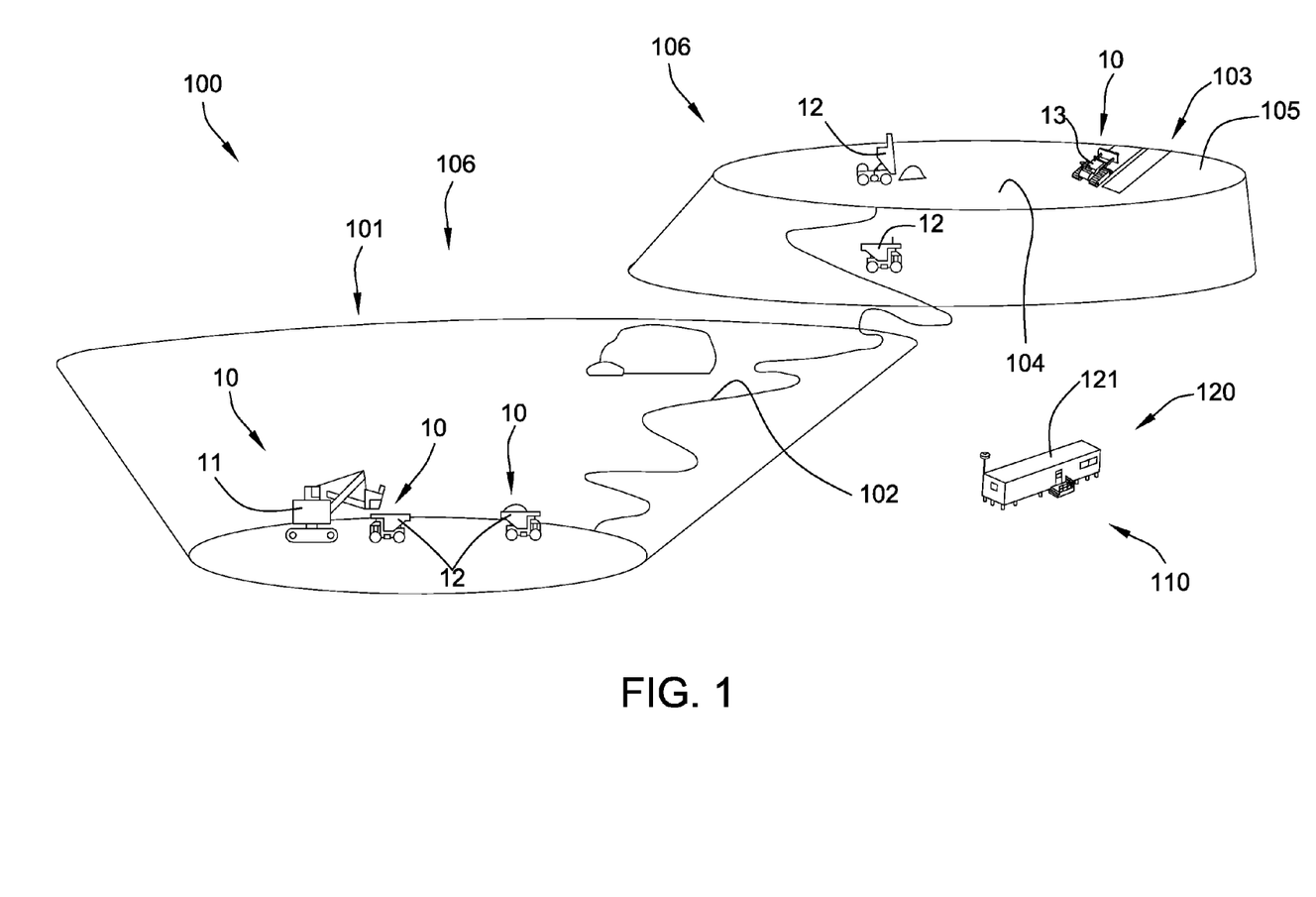
FIG. 1 depicts a schematic illustration of a work site at the principles disclosed herein may be used.

FIG. 1 depicts a diagrammatic illustration of a work site 100 at which one or more machines 10 may operate. Work site 100 may be a portion of a mining site, a landfill, a quarry, a construction site, a roadwork site, a forest, a farm, or any other area in which movement of machines is desired. As depicted, work site 100 includes an open-cast or open pit mine 101 from which material may be excavated or removed by a machine such as an excavator 11 and loaded into a machine such as a haul truck 12. The haul trucks 12 are depicted as traveling along a road 102 to dump location 103 at which the material is dumped. A machine such as a dozer 13 may move material along the work surface 104 towards a crest such as an edge of a ridge 105, embankment, high wall or other change in elevation.

The work site 100 includes one or more work areas 106 at which machines 10 may operate to perform various tasks or operations. As depicted in FIG. 1, a work area 106 for the excavators 11 may be the open pit mine 101 while the work area for the dozers 13 may be the ridge 105. In another example, the work area 106 may include the open pit mine 101, the ridge 105, and the road 102 connecting the two.

Figure 4:
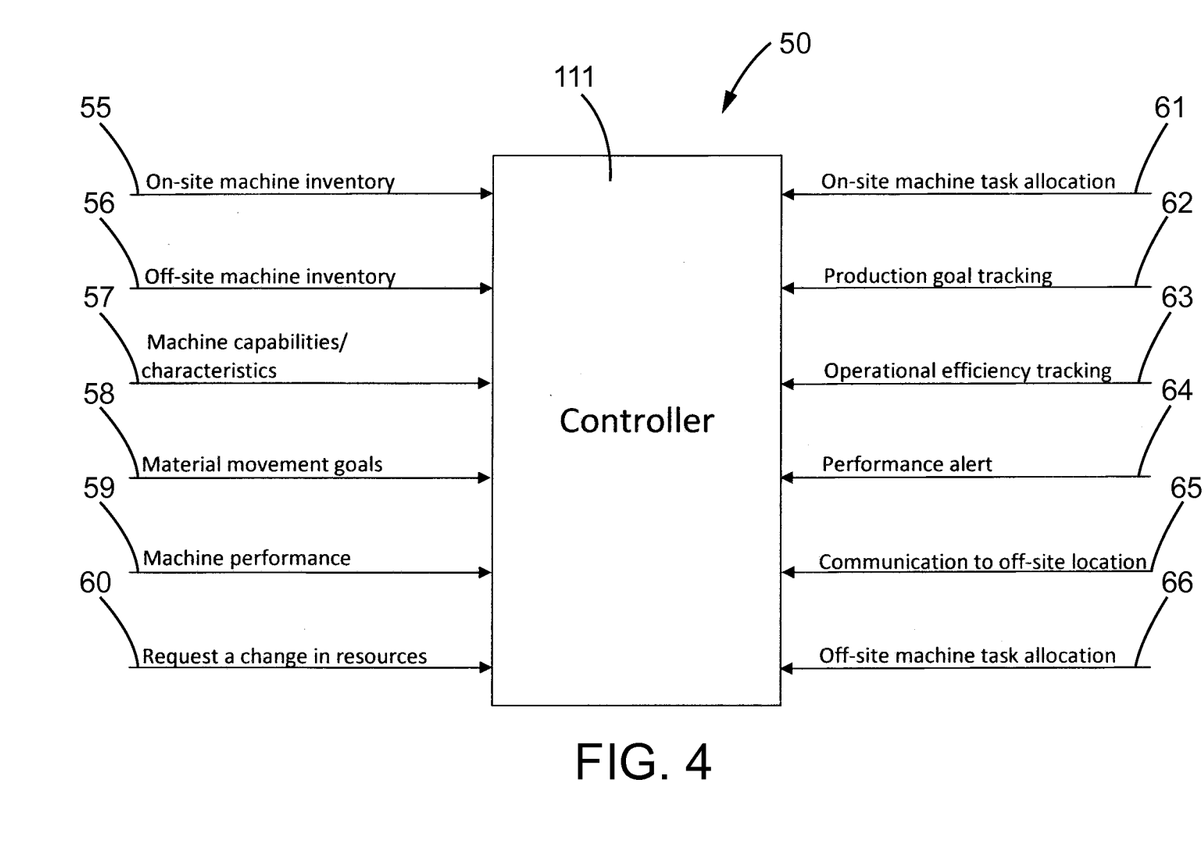
FIG. 4 depicts a block diagram of machine allocation and monitoring system in accordance with the disclosure.

A control system 110 indicated generally by an arrow in FIG. 1 may be associated with the work site 100 and includes a controller 111 (FIG. 4). The control system 110 may be a stand-alone system or may include other systems including those within or associated with the various machines 10 such as machine control systems 35 described below.

Control system 110 may include components at the work area 106 and may also include components located remotely from the work area such at other areas of the work site 100 or at locations remote from the work site. As a result, the functionality of control system 110 may be distributed so that certain functions are performed at the work area 106 and other functions are performed remotely. The control system 110 may include a communications system including both a wireless communications system 120 at a command center 121 and a wired communications systems (not shown) for transmitting signals between components.

The control system 110 may include an electronic control module or controller 111 that may receive various input signals from wireless communications system 120, wired communications systems (not shown), sensors associated with machines 10, or from any other source. The control system 110 and controller 111 may control and provide input to the operation of various aspects of the work area 106 including the specific tasks and operations performed by machines 10.

The controller 111 may be an electronic controller that operates in a logical fashion to perform operations, execute control algorithms, store and retrieve data and other desired operations. The controller 111 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 111 such as power supply circuitry, signal conditioning circuitry, driver circuitry, and other types of circuitry.

The controller 111 may be a single controller or may include more than one controller disposed to control various functions and/or features of the control system 110. For example, the controller 111 may include the machine controllers 36 associated with machines 10. The term "controller" is meant to be used in its broadest sense to include one or more controllers and/or microprocessors that may be associated with the machine 10 and that may cooperate in controlling various functions and operations of the machine.

The functionality of the controller 111 may be implemented in hardware and/or software without regard to the functionality. The controller 111 may rely on one or more data maps relating to the operating conditions and environment at the work area as well as characteristics and capabilities of the machines 10 that may be stored in the memory of controller. Each of these data maps may include a collection of data in the form of tables, graphs, and/or equations.

Figure 2:
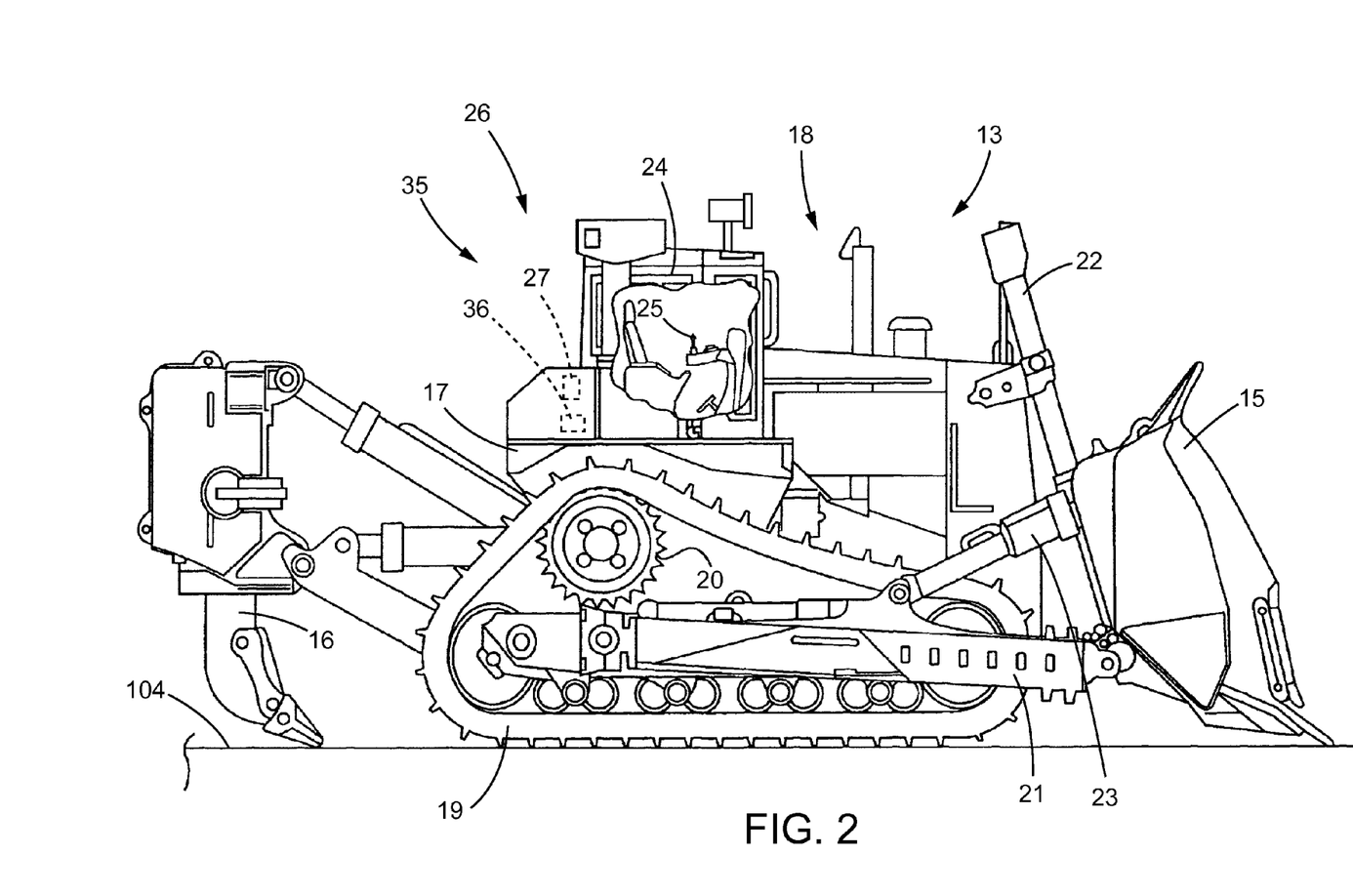
FIG. 2 depicts a diagrammatic illustration of a first machine that may be used at the work site.

Referring to FIG. 2 as an example of a machine 10, a dozer 13 is depicted with a first ground engaging work implement such as a blade 15 for pushing and otherwise moving material and a second ground engaging work implement such as a ripper 16 for performing ripping operations. The dozer 13 includes a frame 17 and a prime mover such as an engine 18. A ground-engaging drive mechanism such as a track 19 on each side of dozer 13 is driven by a drive wheel 20 to propel the machine. Although dozer 13 is shown in a "track-type" configuration, other configurations, such as a wheeled configuration, may be used. Operation of the engine 18 and a transmission (not shown) which are operatively connected to the tracks 19 and drive wheels 20 may be controlled by a machine control system 35 including a machine controller 36. Other types of prime movers and drive systems for causing movement of the dozer 13 are contemplated. Blade 15 may be pivotally connected to frame 17 by arms 21 on each side of dozer 13. First hydraulic cylinder 22 and second hydraulic cylinders 23 on each side of dozer 13 allow movement of the blade 15 relative to the machine.

Dozer 13 may include a cab or operator station 24 that an operator may physically occupy and provide input to control the machine. Operator station 24 may include one or more input devices 25 through which the operator issues commands to control the propulsion and steering of the dozer 13 as well as operate various implements associated with the machine.

Dozer 13 may be equipped with a plurality of machine sensors that provide data indicative (directly or indirectly) of various operating parameters of the machine and/or the environment of the work area 106 at which the machine is operating. The term "sensor" is meant to be used in its broadest sense to include one or more sensors and related components that may be associated with a machine 10 and that may cooperate to sense various functions, operations, and operating characteristics of the machine.

For example, position sensing system 26, as shown generally by an arrow in FIG. 2 indicating association with the dozer 13, may include a position sensor 27 to sense the position of the machine relative to the work area 106. The position sensor 27 may include a plurality of individual sensors that cooperate to provide signals to machine controller 36 to indicate the position of the dozer 13. In one example, the position sensor 27 may include one or more sensors that interact with a positioning system such as a global navigation satellite system or global positioning system "GPS" to operate as a GPS sensor. A machine control system 35 may determine the position of the dozer 13 within work area 106 as well as the orientation of the machine such as its heading, pitch and roll.

Dozer 13 may be controlled by machine control system 35 that includes the machine sensors and an electronic control module or machine controller 36. The machine controller 36 may receive input signals from a wireless communications system 120 (FIG. 1), remote control input signals from an operator using a remote control unit or remote control console (not shown) to operate dozer 13 remotely, or operator input signals from an operator operating the dozer 13 from within operator station 24. The machine controller 36 may control the operation of various aspects of the dozer 13 including the drivetrain and the hydraulic system. The machine controller 36 may be an electronic controller that operates in a logical fashion similar or identical to the controller 111 described above and is not further described herein.

Figure 3:
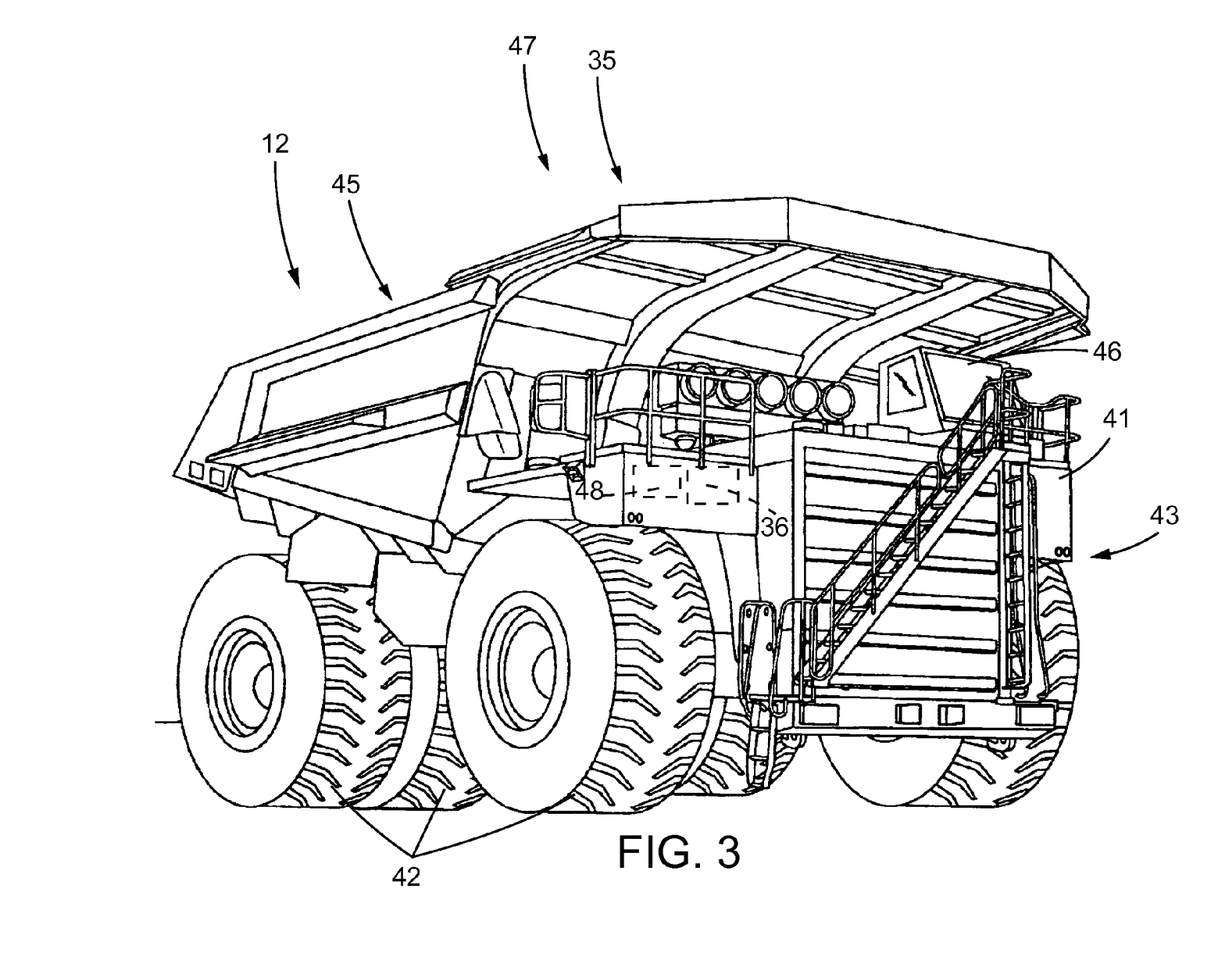
FIG. 3 depicts a diagrammatic illustration of a second machine that may be used at the work site.

Referring to FIG. 3 as a second example of a machine 10, haul truck 12 may include, among other things, a frame 41 supported by one or more traction devices 42 and a propulsion system for propelling the traction devices. The propulsion system may include a prime mover 43, as shown generally by an arrow indicating association with the haul truck 12, and a transmission (not shown) operatively connected to the prime mover. Haul truck 12 includes a dump body 45 and may include a cab or operator station 46 that an operator may physically occupy and provide input to operate the machine.

As with dozer 13, haul truck 12 may include a machine control system 35 having a machine controller 36 and descriptions thereof are not repeated. Haul truck 12 may include a load sensing system 47, as shown generally by an arrow in FIG. 3 indicating association with the haul truck 12, which includes a load sensor 48 to sense the load within the dump body 45. The load sensing system 47 in the haul trucks 12 may be used to determine the amount of material being moved at the work area 106.

Other machines 10 that operate at work area 106 may also include similar machine control systems 35, machine controllers 36, and machine sensors that may be used to directly or indirectly determine the amount of material being moved at the work area 106. In another example in which the amount of material moved is directly determined, excavator 11 may include a load sensing system to determine the amount of material moved from a dig location to a dump location such as a haul truck 12. In another similar example, a wheel loader (not shown) may include a load sensing system to determine the amount of material moved from a dig location to a dump location.

In another example, material movement goals may be set based upon a desired topography of the work surface 104 at the work area 106 and progress towards the goals may be measured based upon changes in the topography. A position sensing system associated with one or more machines 10 together with the dimensions of the machines may be used to determine the position of the work surface 104. For example, a position sensing system may determine the height of the sensors on a machine 10 above a reference such as sea level. Based upon knowledge of the position of the sensors relative to ground engaging traction devices on the machine (e.g., wheels, tracks, etc.), the location of the work surface 104 may be determined.

In still another example, the amount of material moved may be determined indirectly based upon changes in the topography of the work surface 104. For example, controller 111 may be able to determine a volume of material moved by comparing the topography at the work area 106 both before and after a material moving operation performed by a dozer 13.

The control system 110 may include a machine allocation and monitoring system indicated generally at 50 (FIG. 4) that operates to analyze tasks or operations to be performed at the work area 106, allocates the tasks to the machines 10 located at the work area, and determines whether the machines located at the work area are sufficient to perform the desired tasks in the desired period of time. The machine allocation and monitoring system 50 may also determine whether the use of machines located off site would permit the desired tasks to be performed in the desired period of time or increase the operational efficiency of the work area performance and as well as monitor the operational performance of the tasks and adjust the operation or the machines being used to improve the operational performance at the work area.

As depicted in FIG. 4, the controller 111 receives information from various sensors and systems at the work area 106 and processes this information. Controller 111 may receive, at node 55, signals indicative of the number and types of machines 10 available at the work area 106. The number and types or inventory of machines may be entered and stored within the controller 111 manually, transmitted directly from each of the machines 10 at the work area 106, may be stored as part of a "back office" system, or stored in any other desired manner. At node 56, signals indicative of the number and type of machines 10 available for use at remote locations but accessible to the work area 106 may be received by the controller 111. Examples of remote locations that may have machines that are accessible to the work area 106 include other areas at the work site 100 such as other work areas and maintenance locations, together within off-site locations such as dealers, rental agencies, and businesses with a cooperative relationship. The remote inventory may be obtained from any of the remote locations in any desired manner. As used herein, the reference to machines 10 is not limited to the machines but also includes work implements and tools that may be used with such machines. For example, many of the machines 10 include work implements and other components that may be changed or substituted based upon a desired change in capacity or performance. For example, a bucket (not shown) of an excavator may be changed to change the capacity of the bucket or based upon different types of material being moved, both of which may change the capacity of the machine.

At node 57, the capabilities and characteristics of each of the machines 10 that may be at the work area 106 or a remote location may be entered. The capabilities and characteristics may be entered manually or may be stored within the controller 111 and periodically updated as new machines become essentially available. The capabilities and characteristics of the machines not only vary based upon the type of machine, but also based upon the size and configuration of the machine. Examples of the capabilities and characteristics include payload capacity, bucket size, type of work implement, and the manner in which the work implement is attached to the machine 10. At node 58, one or more material movement goals may be entered into controller 111. In one example, management personnel may enter the desired amount of material to be moved over a specified production time period. In another example, the material movement goal may be set as a specified change in topography at the work area 106.

At node 59, the controller 111 may receive data, directly or indirectly, from the machines 10 operating at the work area 106. In one example, sensors associated with the machines 10 may generate data that is transmitted wirelessly to controller 111. In another example, sensors associated with the machines 10 may generate data that is transmitted wirelessly but indirectly to the controller 111. The data may include the amount of material being moved by each machine 10, the topography of the work surface 104, and/or any other desired information. At node 60, a request for additional resources or a change in the resources may be entered into controller 111.

The controller 111 may generate various output signals based upon the operation of the machine allocation and monitoring system 50. At node 61, the controller 111 may generate an allocation of the available machines 10 that are located on-site or at the work area 106. In doing so, the controller 111 may analyze the material movement goal together with the specified production time and divide the material movement goal into a plurality of tasks. The controller 111 may then determine the allocation of machines 10 located at the work area 106 based upon the highest efficiency of operation or based upon any other desired goal.

At node 62, the controller 111 may generate signals indicative of the operation of the machines 10 and compare their operation to the material movement goals, the individual tasks for each machine, and/or the elapsed production time to determine how closely the actual machine operation is to the desired machine operation. At node 63, the controller 111 may generate signals indicative of the efficiency of the material movement operation. For example, some tasks may be ahead of schedule while other tasks are behind schedule which may create an imbalance in the performance of operations at the work area which may negatively impact the efficiency of the material movement operation.

At node 64, the controller 111 may generate performance alerts if the performance at the work area 106 is off schedule or if the efficiency of the operation is below a desired threshold. The performance alerts may be communicated to personnel at the work area as desired. At node 65, the performance alerts may be communicated to personnel at off-site or remote locations. In doing so, the remote personnel may be alerted to a potential need for additional machines 10 at the work area 106. As a result, the remote personnel may begin to make preparations in case a request for movement of the machines from the remote location to the work area 106 is generated or communicated.

If remote machines are requested to be transported to the work area, the controller 111 may generate at node 66 an allocation of the available machines 10 that includes both those machines that are located on-site at the work area 106 as well as those at the remote location. In one example, the controller 111 may determine the allocation of machines 10 located at the work area 106 based upon the use of all of the machines at the work area while minimizing the number of machines from the remote location. In another example, the controller 111 may determine the allocation based upon the highest efficiency of operation regardless of the origin of the machines 10 (i.e., regardless of whether the machines are located at the work area 106 or the remote location).

Figure 5:
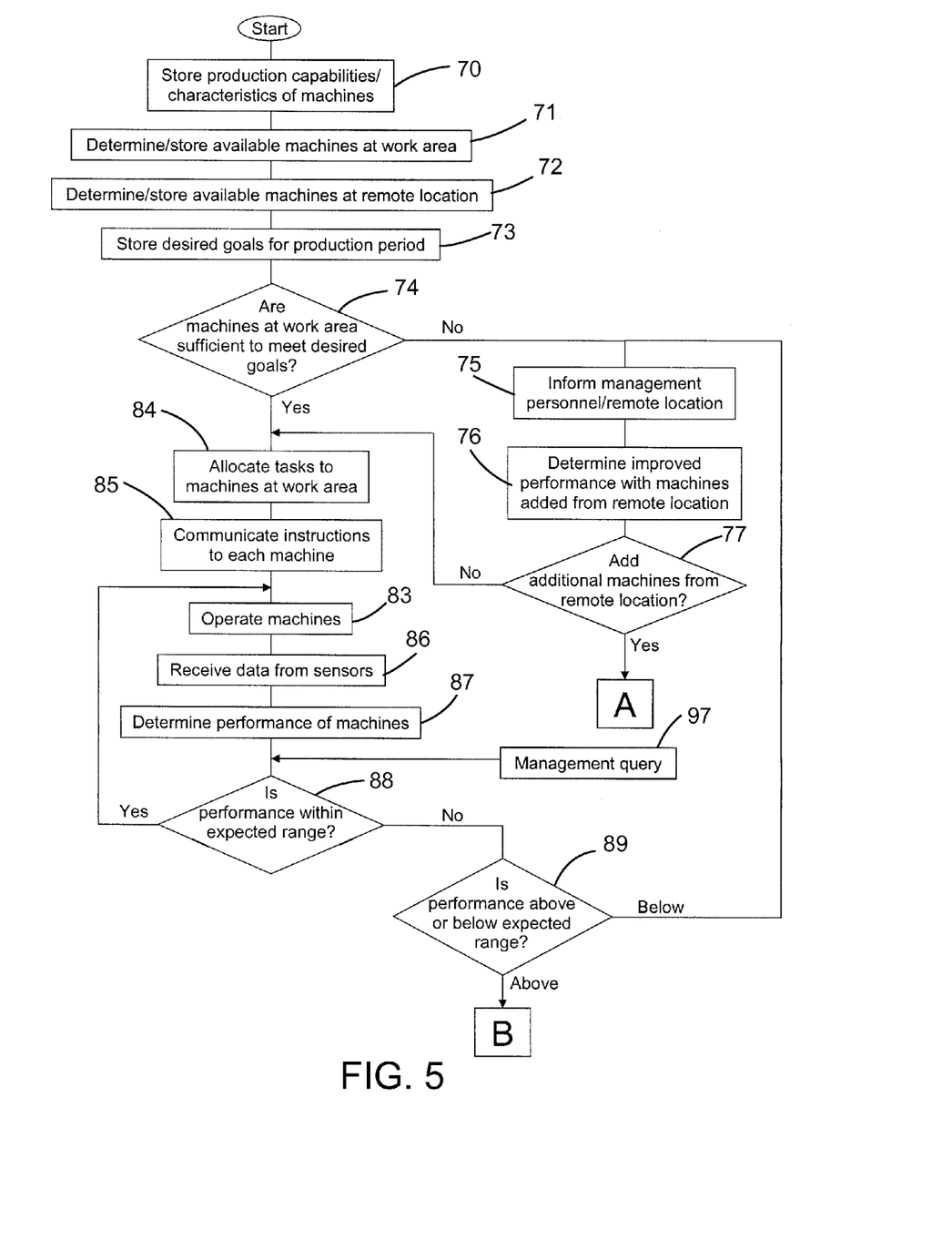
FIG. 5 depicts a flowchart illustrating a machine allocation and monitoring system in accordance with the disclosure.

FIG. 5 depicts the operation of the machine allocation and monitoring system 50 in conjunction with the operation of machines 10 at the work area 106. At stage 70, the capabilities and characteristics of each of the machines that may be operative at the work area 106 or located at a remote location may be entered into controller 111. The capabilities and characteristics may be entered manually by personnel at the work area 106 or at another location or may be preloaded within controller 111. In all instances, the capabilities and characteristics of the machines 10 may be updated as desired.

At stage 71, the number and types of machines 10 that are available for material moving operations at the work area 106 may be determined and stored within the controller 111. In one example, an inventory of the available machines may be generated manually. In another example, the inventory of available machines may be generated electronically based upon communications with each of the machines such as with their machine controllers 36 or based upon sensors or other systems associated with each machine. Upon determining the number and types of machines 10 that are available at the work area 106, such information may be stored within controller 111.

At stage 72, the number and types of machines 10 located at a remote location that are available for material moving operations at the work area 106 may be determined and stored within the controller 111. The remote location may include other areas at the work site 100 such as other work areas and maintenance locations as well as off-site locations such as dealers, rental agencies, and cooperative businesses. As with the on-site inventory, the off-site inventory of the available machines may be generated manually or electronically. For example, a local dealer or rental agency may periodically communicate with the controller 111 to update the off-site inventory that is available for use at the work area 106. Regardless of the manner in which the off-site inventory is determined, the number and types of machines 10 that are available off-site for use at the work area 106 may be stored within controller 111. As stated above, the reference to machines 10 also includes work implements and tools that may be used with such machines and thus the on-site and off-site inventory may include a listing of available work implements and tools.

One or more material movement goals for a specified production time period may be entered into controller 111 at stage 73. In one example, the desired amount of material to be moved over a specified production time may be stored within the controller 111. In another example, a material movement goal may be set by specifying a desired topography at the work area 106. In doing so, the topography at various locations (e.g., the removal of a specified depth of material or the grading of roads) at the work area 106 may be stored within controller 111. The material movement goals may be entered within the controller 111 by any desired or authorized person such as management personnel located at the work area 106 or at any other location including locations remote from the work area.

The production time period may be any desired length of time. While the machine allocation and monitoring system 50 may be useful for analyzing material movement plans and capabilities, in some instances, it may be desirable for the production time period to be substantially longer than the time required to transport the machines 10 from a remote location and place them into operation at the work area 106.

The controller 111 may determine at decision stage 74 whether the machines 10 at work area 106 are sufficient to meet the desired material movement goals within the production time period. In doing so, the controller 111 may divide the material movement goal into a plurality of tasks and allocate machines 10 at the work area 106 to each task to be performed based upon the capabilities (e.g., material moving capacity) of each machine. In some instances, the controller 111 may also modify the capabilities of the machines 10 based upon the operating conditions (e.g., the weather) at the work area 106 or the skills of an operator. As an example, the characteristics of some machines 10 may result in reduced material moving capacity under some operating conditions while the material moving capacity of other machines may remain relatively constant regardless of the operating conditions.

If the machines 10 at work area 106 are insufficient to meet the desired material movement goals within the production time period at decision stage 74, the controller 111 may generate an alert command at stage 75. The alert command may include informing personnel at the work area 106 as well as at a remote location. For example, it may be desirable to inform management personnel located at the work area 106 and/or a remote location for purposes of managing the material moving operation. In addition, it may be desirable to notify a remote location at which machines 10 are available that the machines at the work area 106 are insufficient to meet the desired material movement goals within the specified production time period. By providing such notice to the remote location upon determining that insufficient capacity exists at the work area 106, personnel at the remote location may begin to make preparations for moving machines 10 from the remote location to the work area 106.

At stage 76, the controller 111 may determine whether performance at the work area 106 may be improved upon through the use of machines 10 from a remote location. For example, the controller 111 may re-analyze the allocation of machines 10 to each of the tasks determined at decision stage 74 and determine whether the addition of machines from the remote location will sufficiently increase the performance to meet the desired material movement goals within the specified production time period. In doing so, the controller 111 may determine the number and types of machines to be added from the remote location will provide the necessary increase in performance. While determining the change in performance, the controller 111 may also be configured to identify the cost of providing the remote equipment (e.g., rental and transportation costs) as well as the time required to transport the machines from the remote location to the work area 106.

Based upon the number of machines 10 required to increase the performance as well as other factors such as additional costs and transportation time, a decision may be made at decision stage 77 as to whether to add machines from the remote location. In some instances, the decision at decision stage 77 may be made by management or other personnel. In other instances, the controller 111 may be configured to add the remote machines based upon predetermined parameters. For example, remote machines may be added if the rental or other costs are less than a predetermined amount. In another example, remote machines may be added if the transportation time from the remote location is less than a predetermined time period. The predetermined time period may be set by any authorized personnel such as management personnel on- or off-site or may be pre-programmed within controller 111. In still another example, remote machines may be added if the additional machines will substantially increase the operating efficiency at the work area 106. For example, adding remote machines to increase the performance of certain tasks that may be behind schedule may increase the efficiency of the entire material movement operation by permitting all of the tasks to be performed at approximately their maximum rates (i.e., reduce "bottlenecks").

Figure 6:
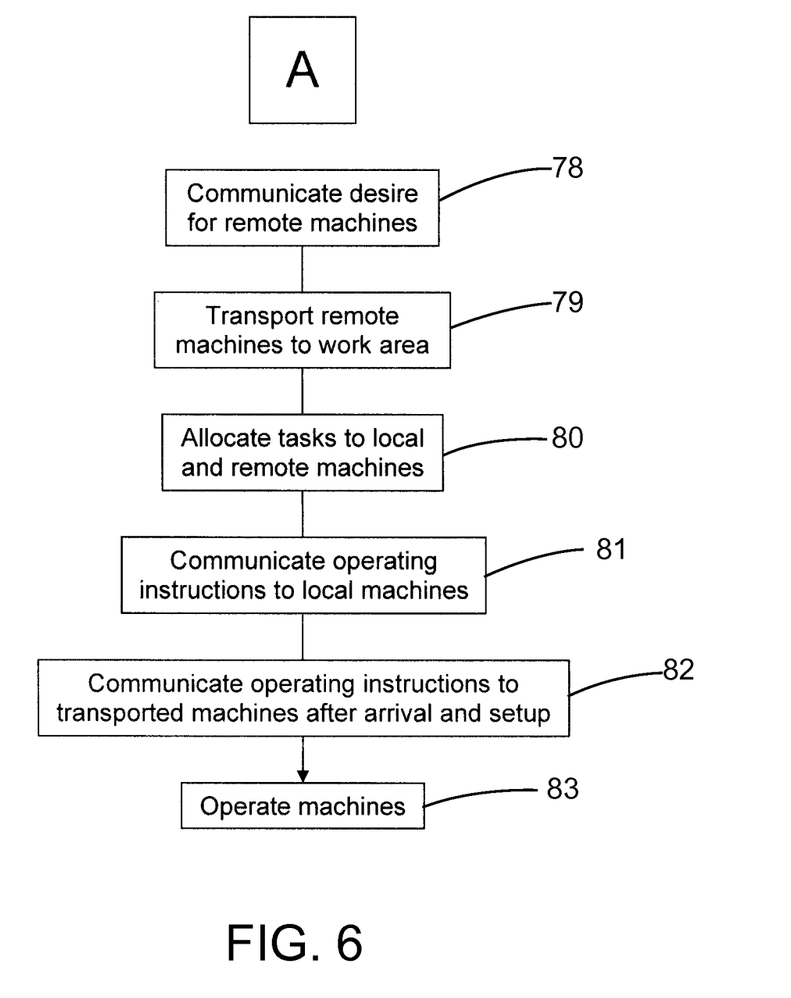
FIG. 6 depicts a flowchart illustrating a further aspect of the machine allocation and monitoring system of FIG. 5.

Referring to FIG. 6, if a decision is made to add machines 10 to the work area 106 from the remote location, a communication may be sent at stage 78 to the remote location. At stage 79, the remote machines may be transported from the remote location to the work area 106. While the remote machines are being transported to the work area 106, the controller 111 may re-allocate at stage 80 the tasks to be performed amongst both the machines currently at the work area and the machines that are being transported.

In some instances, it may be desirable for the local machines (i.e., the machines currently at the work area 106) to begin or continue operating at the work area according to a first operating plan prior to the arrival of the machines being transported and according to a second operating plan once the machines being transported arrive and are in operation. In other instances, the local machines may operate according to a specified operating plan both before and after the arrival of the transported machines. In either case, operating instructions for each of the local machines may be communicated at stage 81 to each machine. In some instances, the communication may be transmitted electronically from controller 111 to the machine controller 36 associated with each machine 10. In other instances, the communication may be transmitted from management personnel to a machine operator. Other forms of communication are contemplated.

Once the transported machines arrive at the work area 106 and are set up for operation, operating instructions for each of the transported machines may be communicated at stage 82 to each machine 10. As described above, the communication may be transmitted electronically, from person to person, or otherwise. At stage 83, the machines 10 may be operated according to the desired operating plan at the work area 106 for each task. It should be understood that, as described above, the local machines may operate at the work area 106 prior to the arrival of the transported machines, if desired. While operating the machines 10 at stage 83, the controller 111 may also operate in accordance with stages 86-87 (FIG. 5) and follow decision stage 88 as described below.

If a decision is made not to add machines to the work area 106 from the remote location at decision stage 77 (FIG. 5) or if the number of machines 10 at work area 106 were sufficient to meet the desired material movement goals within the production time period, the tasks determined at decision stage 74 may be allocated or assigned at stage 84 to each of the machines 10 at the work area 106. At stage 85, operating instructions for each of the machines 10 at work area 106 may be communicated to each machine. As described above, the communication may be transmitted electronically, from person to person, or otherwise. It should be noted that in some instances, the number of machines 10 at work area 106 will be sufficient to meet the desired material movement goals within the production time period if the machines work in an unbalanced manner. For example, it may be desirable to have some of the machines 10 located at the work area 106 continue to work (e.g., work overtime) to provide additional resources at the work area without adding or moving machines from the remote location.

Based upon the communication, the machines 10 may be operated according to the desired operating plan as described above with respect to stage 83 in FIG. 6. At stage 86, data may be received from the various sensors associated with the machines 10. In one example, sensors located on a machine 10 may generate data that is transmitted to machine controller 36. In another example, the sensors located on a machine 10 may generate data that is transmitted to a controller remote from the machine controller 36. The controller remote from the machine controller 36 may form a portion of controller 111.

Controller 111 may determine, directly or indirectly, at stage 87, the performance of each of the machines 10. In an example in which sensors located on the machine 10 transmit data to a machine controller 36, the performance of the machine may be determined by the machine controller and transmitted to controller 111. In an example in which the data is transmitted to a controller remote from the machine controller 36, the machine performance may be determined by the remote controller or the controller 111.

At decision stage 88, the controller 111 may determine whether the performance of one or more machines 10 is within an expected threshold or range. In one aspect, the controller 111 may determine whether the overall performance of the machines 10 operating at the work area is meeting a desired threshold. An example of a desired range may be that the operation is within a predetermined percentage of the desired material movement goals. For example, if the material movement goal is to move a certain amount of material within an eight hour shift, the machine allocation and monitoring system 50 may divide the eight hour shift into equal size time periods and measure the progress at the end of each specified time period. If the amount of material moved is greater or less than a predetermined percentage of the goal for the specified time period, the performance may be considered outside the expected range.

In another example, the controller 111 may analyze each task being performed to ensure that equal progress is being made towards the completion of each task so that the tasks are completed in a balanced manner in order to maintain the overall efficiency of the operation at the work area 106. For example, referring back to FIG. 1, if the excavator 11 is often waiting for haul trucks 12 or material is being dumped at ridge 105 faster than the dozers 13 can move the material, the overall efficiency of the material moving process at the work area 106 may be outside the expected range. Still further, the controller 111 may analyze the performance of each machine 10 to ensure that each machine is operating within a desired range. If an individual machine is operating outside of the desired or expected range of operation, the efficiency of the specific task being performed and thus the overall efficiency at the work area 106 may be outside of the desired range.

If the overall performance at the work area 106 as well as the performance of any individual tasks or machines 10 that are being measured are within the expected ranges at decision stage 88, the machines may continue to be operated as desired at stage 83, stages 86-87 repeated, and decision stage 88 followed.

If the overall performance at the work area 106 as well as the performance of any individual tasks or machines 10 that are being measured are outside of the expected ranges at decision stage 88, the controller 111 may determine at decision stage 89 whether the performance is above or below the expected range. If the performance is below the expected range, an alert command may be generated at stage 75, and stages 75-76 repeated, and decision stage 77 followed.

If the performance is above the expected range at decision stage 89, the controller 111 may determine at stage 90 (FIG. 7) the efficiency of operation at the work area 106 if a reduction is made in the performance of any of the machines 10 at the work area. For example, if the haul trucks 12 are waiting for a significant period of time to either be loaded by the excavator 11 or to dump their load at a desired location, it may be desirable to reduce the travel speed of the haul trucks. The controller 111 may also be configured to determine at stage 91 the efficiency of operation at the work area 106 if a reduction is made in the number of machines operating at the work area. For example, using the example of the haul trucks 12 waiting to be loaded or waiting to dump their loads, the controller 111 may also determine the efficiency of operation if one or more haul trucks are removed from operation at the work area 106.

Figure 7:
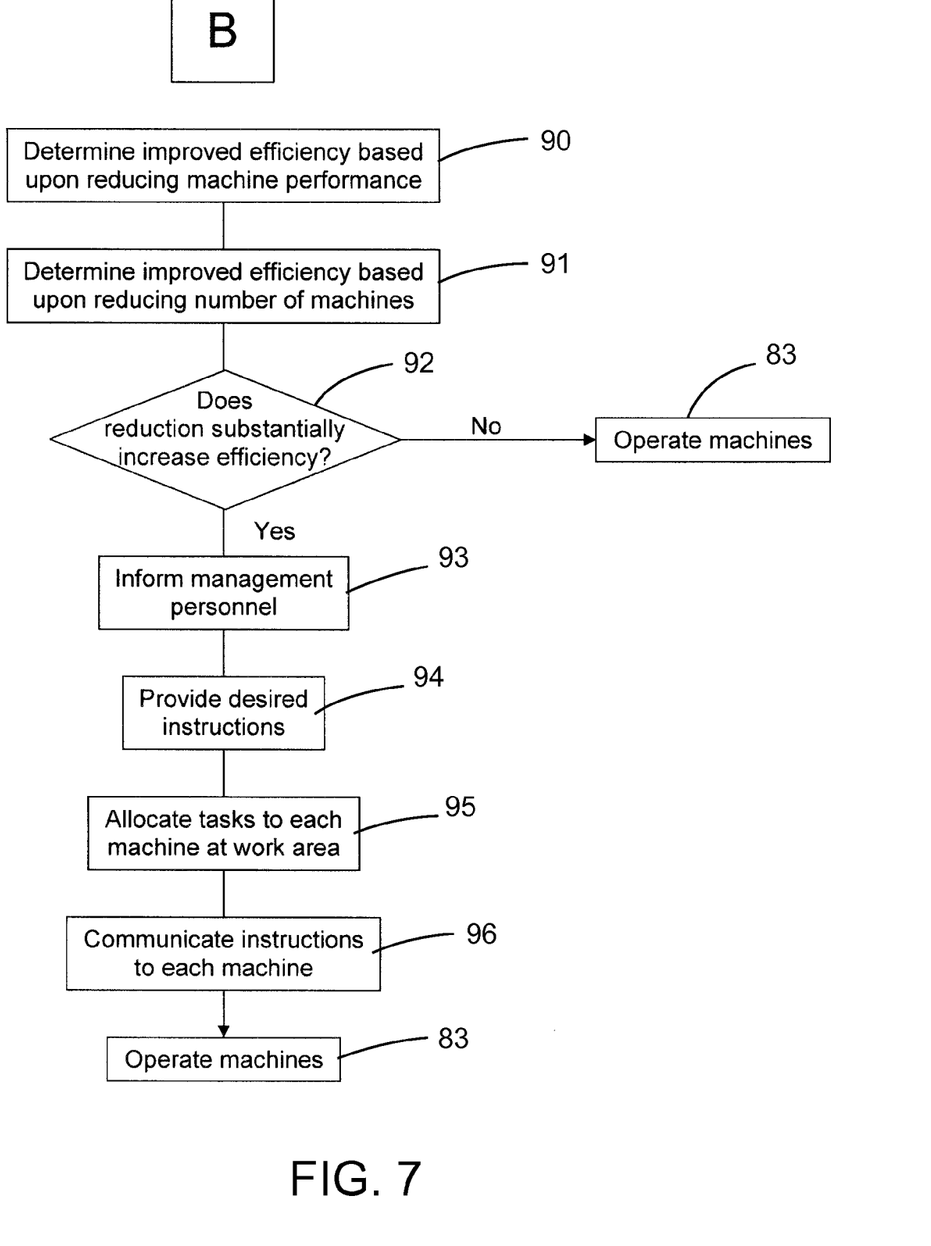
FIG. 7 depicts a flowchart illustrating a still another aspect of the machine allocation and monitoring system of FIG. 5.

At decision stage 92, the controller 111 may determine whether a reduction in machine performance at stage 90 or a reduction in the number of machines 10 at stage 91 will substantially increase the efficiency (e.g., 10%) of operation at the work area 106. In one example, a predetermined percentage increase in efficiency may be deemed a substantial increase in efficiency. In another example, a reduction in the cost of operation (e.g., reduced fuel costs or rental charges) combined with a relatively modest or small decrease in performance may also be considered a substantial increase in the efficiency of operation at the work area 106.

If a reduction in machine performance or a reduction in the number of machines will not substantially increase the efficiency at decision stage 92, the machines 10 may operate at the work area 106 in accordance with stage 83 as described above with respect to FIG. 6. While operating the machines 10 at stage 83, the controller 111 may also operate in accordance with stages 86-87 (FIG. 5) and follow decision stage 88.

If a reduction in machine performance or a reduction in the number of machines will substantially increase the efficiency at decision stage 92, the controller 111 may generate an alert command at stage 93. The alert command may include informing decision making personnel such as management personnel who may be at the work area 106 and/or at a remote location.

At stage 94, the decision making personnel or the controller 111 may determine whether to reduce the performance of any of the machines as described with respect to stage 90 or whether to reduce the number of machines in operation at the work area 106 as described with respect to stage 91.

The controller 111 may allocate at stage 95 the tasks to be performed amongst the machines in operation at the work area 106. Operating instructions for all of the machines 10 at the work area 106 may be communicated at stage 96 to each machine. As described above, the communication may be transmitted electronically, from person to person, or otherwise. The machines 10 may then be operated according to the desired operating plan at the work area 106 at stage 83 as described above with respect to FIG. 6. While operating the machines 10 at stage 83, the controller 111 may also operate in accordance with stages 86-87 (FIG. 5) and follow decision stage 88 as described above.

At any time, an inquiry may be made at stage 97, such as by management personnel located at the work area 106 or remotely, as to whether the material movement process is within the expected range. The process may follow decision stage 88 upon such an inquiry.

INDUSTRIAL APPLICABILITY

The industrial applicability of the system described herein will be readily appreciated from the foregoing discussion. The foregoing discussion is applicable for use with material movement processes using machines 10 that are operated at a work area 106. The machine allocation and monitoring system 50 may be used at a mining site, a landfill, a quarry, a construction site, a roadwork site, a forest, a farm, or any other area in which material movement operations are desired.

The machine allocation and monitoring system 50 may be used with machines 10 that operate in an autonomous, a semi-autonomous, or a manual manner. As used herein, a machine 10 operating in an autonomous manner operates automatically based upon information received from various sensors without the need for human operator input. As an example, a haul truck 12 that automatically follows a path from one location to another and dumps a load at an end point may be operating autonomously. A machine 10 operating semi-autonomously includes an operator, either within the machine or remotely, who performs some tasks or provides some input and other tasks are performed automatically and may be based upon information received from various sensors. As an example, a haul truck 12 that automatically follows a path from one location to another but relies upon an operator command to dump a load may be operating semi-autonomously. In another example of a semi-autonomous operation, an operator may dump a bucket from an excavator 11 in a haul truck 12 and a controller may automatically return the bucket to a position to perform another digging operation. A machine 10 being operated manually is one in which an operator is controlling all or essentially all of the functions of the machine. A machine 10 may be operated remotely by an operator (i.e., remote control) in either a manual or semi-autonomous manner.

It will be appreciated that the foregoing description provides examples of the disclosed system and technique. All references to the disclosure or examples thereof are intended to reference the particular example being discussed at that point and are not intended to imply any limitation as to the scope of the disclosure more generally. For example, although described in the context of slot dozing, the foregoing description is applicable to a wide variety of environments, operations, and applications. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for allocating resources, comprising:
a plurality of first machines at a work area;
a plurality of second machines selected from an inventory of machines at a remote location remote from the work area;
a sensor mounted on any of the machines for monitoring material movement;
a controller configured to:
store a desired material movement goal for a production time period;
store a capacity for each of the plurality of first machines;
store a capacity for each of the plurality of second machines;
determine a total capacity at the work area based upon the capacity of each of the plurality of first machines and the production time period;
compare the total capacity at the work area to the desired material movement goal;
upon the total capacity at the work area exceeding the desired material movement goal, generate operational instructions for selected ones of the plurality of first machines and communicate the operational instructions to each of the selected ones of the plurality of first machines;
upon the total capacity at the work area being less than the desired material movement goal, generate a first alert command; and
determine whether utilizing any of the plurality of second machines at the work area will increase an operational efficiency at the work area above a threshold when the total capacity at the work area exceeds the desired material movement goal, and generate a second alert command upon a determination that utilizing any of the plurality of second machines at the work area will increase the operational efficiency at the work area above the threshold.

2. The system of claim 1, wherein upon generating an alert command and upon transporting at least some of the plurality of second machines to the work area, the controller is configured to generate operational instructions for each selected ones of the plurality of first machines and the at least some of the plurality of second machines and communicate operational instructions to the selected ones of the plurality of first machines and the at least some of the plurality of second machines.

3. The system of claim 2, wherein the controller is further configured to determine operational performance at the work area based upon the material movement, compare the operational performance to the desired material movement goal, and generate an alert command if the operational performance is less than a threshold.

4. The system of claim 1, wherein the at least one sensor includes a sensor for determining a position of a work surface at the work area.

5. The system of claim 4, wherein the sensor for determining a position of the work surface at the work area includes a position sensor associated with at least one of the first machines.

6. The system of claim 1, wherein the at least one sensor includes at least one sensor for determining an amount of material moved at the work area.

7. The system of claim 1, wherein the controller is further configured to generate an alert command and communicate with the remote location upon a machine at the work area becoming inoperative.

8. The system of claim 1, wherein the controller is further configured to communicate with the remote location upon the total capacity at the work area being less than the desired material movement goal.

9. The system of claim 1, wherein the desired material movement goal includes a plurality of tasks and the controller is configured to assign machines from the plurality of first machines to each of the plurality of tasks and determine whether the plurality of first machines includes a sufficient number of machines to complete each of the plurality of tasks in the production time period.

10. The system of claim 9, wherein the controller is further configured to allocate machines from the plurality of second machines to certain of the plurality of tasks to meet the desired material movement goal.

11. The system of claim 9, further including at least one sensor for monitoring material movement and the controller is configured to determine operational performance at the work area based upon the material movement, and determine whether any of the plurality of tasks are ahead of schedule based upon the operational performance.

12. The system of claim 11, wherein the controller is configured to remove at least one machine from operation at the work area in response to any of the plurality of tasks being ahead of schedule.

13. The system of claim 11, wherein the controller is configured to reduce performance of at one machine at the work area in response to any of the plurality of tasks being ahead of schedule.

14. A controller implemented method of allocating resources, comprising:
storing a desired material movement goal for a production time period;
storing a capacity for each of a plurality of first machines at a work area;
receiving material movement data from a sensor mounted on any of the machines;
storing a capacity for each of a plurality of second machines selected from an inventory of machines at a remote location from the work area;
determining a total capacity at the work area based upon the capacity of each of the plurality of first machines and the production time period;
comparing the total capacity at the work area to the desired material movement goal;
upon the total capacity at the work area exceeding the desired material movement goal, generating operational instructions for selected ones of the plurality of first machines and communicating the operational instructions to each of the selected ones of the plurality of first machines;
upon the total capacity at the work area being less than the desired material movement goal, generating a first alert command; and
determining whether utilizing any of the plurality of second machines at the work area will increase an operational efficiency at the work area above a threshold when the total capacity at the work area exceeds the desired material movement goal, and generate a second alert command upon a determination that utilizing any of the plurality of second machines at the work area will increase the operational efficiency at the work area above the threshold.

15. The method of claim 14, wherein upon generating an alert command and upon transporting at least some of the plurality of second machines to the work area, further including generating operational instructions for each selected ones of the plurality of first machines and the at least some of the plurality of second machines and communicating operational instructions to the selected ones of the plurality of first machines and the at least some of the plurality of second machines.

16. The method of claim 14, further including determining operational performance at the work area based upon material movement at the work area, comparing the operational performance to the desired material movement goal, and generating an alert command if the operational performance is less than a threshold.

17. The method of claim 16, further including determining the material movement based upon an amount of material moved.

18. The method of claim 16, further including determining the material movement based upon a position of a work surface at the work area.

19. A system for allocating resources, comprising:
a plurality of first machines at a work area;
a plurality of second machines selected from an inventory of machines at a remote location remote from the work area;
at least one sensor for monitoring material movement at the work site;
a controller configured to:
store a desired material movement goal for a production time period;
store a capacity for each of the plurality of first machines;
store a capacity for each of the plurality of second machines;
receive material movement data from a sensor mounted on any of the machines;
determine a total capacity at the work area based upon the capacity of each of the plurality of first machines and the production time period;
compare the total capacity at the work area to the desired material movement goal;
upon the total capacity at the work area exceeding the desired material movement goal, generate operational instructions for selected ones of the plurality of first machines and communicate the operational instructions to each of the selected ones of the plurality of first machines;
upon the total capacity at the work area being less than the desired material movement goal, generate an alert command;
determine operational performance at the work area based upon the material movement at the work site; and
upon the operational performance being less than a threshold for a specified time period, generate a first alert command; and
determine whether utilizing any of the plurality of second machines at the work area will increase an operational efficiency at the work area above a threshold when the total capacity at the work area exceeds the desired material movement goal, and generate a second alert command upon a determination that utilizing any of the plurality of second machines at the work area will increase the operational efficiency at the work area above the threshold.

* * * * *